United States Patent

[11] 3,614,430

[72] Inventor Robert M. Berler
Westport, Conn.
[21] Appl. No. 805,421
[22] Filed Mar. 10, 1969
[45] Patented Oct. 19, 1971
[73] Assignee Pitney Bowes-Alpex, Inc.
Danbury, Conn.

[54] FLUORESCENT-INK-IMPRINTED CODED DOCUMENT AND METHOD AND APPARATUS FOR USE IN CONNECTION THEREWITH
7 Claims, 4 Drawing Figs.

[52] U.S. Cl. .......... 250/71 R, 235/61.11 E, 250/219 DC, 283/7
[51] Int. Cl. .......... G01n 21/38
[50] Field of Search .......... 250/71, 219 DC, 83.3 UV; 235/61.11; 283/7, 8

[56] References Cited

UNITED STATES PATENTS

| | | | |
|---|---|---|---|
| 2,742,631 | 4/1956 | Rajchman et al. | 250/71 UX |
| 3,394,263 | 7/1968 | Baker | 250/71 X |
| 3,444,517 | 5/1969 | Rabinow | 250/71 X |
| 3,466,775 | 9/1969 | Smith | 250/71 X |
| 3,486,006 | 12/1969 | Siegel | 250/71 X |

*Primary Examiner*—James W. Lawrence
*Assistant Examiner*—Davis L. Willis
*Attorney*—Arthur J. Plantamura

ABSTRACT: A document comprising a substantially translucent matrix or substrate upon which coded information is imprinted with fluorescent ink. This combination allows the coded document to be read similarly as a punched car or tape, i.e. by placing the source of light on one side of the document and the photoelectric sensor on the other side of the document. The generation of this kind of document, i.e. using a simple printing operation, obviates the disadvantages incurred in generating punched documents while at the same time it preserves the essential advantages inherent in the use of the latter. A simple reliable device is used to read the lighted fluorescent ink imprint through the body of the matrix.

INVENTOR
ROBERT M. BERLER
BY
Arthur J. Plantamura
ATTORNEY.

FLUORESCENT-INK-IMPRINTED CODED DOCUMENT AND METHOD AND APPARATUS FOR USE IN CONNECTION THEREWITH

This invention relates to novel, coded information-bearing documents such as cards, tapes or tickets imprinted with fluorescent ink which are adapted to be read by machine. It relates also to a method for imprinting and reading such coded documents and to a suitable apparatus which is capable of sensing the coded intelligence by means of light which is projected through the document upon which fluorescent imprint has been applied.

One of the most practical machine-readable documents, from a technical viewpoint, is the punched card or punched tape. This is so because of the excellent signal-to-noise ratio possible with the combination of an opaque card and a hole to pass light through.

Another method commonly used relies on a mark placed (usually imprinted) on the surface of the document and then detected by projecting light on the fluorescent imprint; the reflected light is picked up using photoelectric sensors. The signal-to-noise of this latter system is inferior to that of the punched document.

In spite of the relative superiority, there are a number of disadvantages in using the punched document; in particular, these disadvantages occur in the making of the punched document. During generation or punching, the document must pass through a special document-punching machine. Unlike a printed document, it cannot be punched on a computer printer or typewriter (electric or manual). Also, the punching operation is noisy, causes punched paper waste which presents a disposal problem and requires the punches be maintained and kept very sharp. Also occasionally these punches have a tendency to jam. Unlike computer printing, where one document can be different from the next, and where they can be printed at high speeds, the document puncher must generally be set up for different documents each time. Also unlike the computer printer which is capable of printing both machine- and human-readable symbols, the puncher can produce only machine-readable holes. In some cases, a combination of a punching machine and printer is used but this is relatively expensive and slow. However, as noted, once punched, these documents have far less disadvantages during the readout cycle than do the marked documents.

It is thus apparent that it would be desirable if a document which is generated on a computer printer could be read in the same manner as a punched document; with both these features, the many advantages of both-type documents could be combined into a single new-type document. For example, a document of this type is both machine and human readable. In essence, accordingly, the present invention is directed to the generation of a document which may be utilized as though it was punched, when in fact it has printed format.

OBJECTS OF THE INVENTION

It is an object of this invention to provide a novel document bearing coded intelligence comprising a substantially translucent substrate on which the coded intelligence has been imprinted with fluorescent ink.

It is another object of the invention to provide a novel system for imprinting and reading coded intelligence which employs a substantially translucent document with fluorescent marking and a document reader cable of photoelectrically sensing the intelligence by projecting UV light on the document and detecting the marking from the other side of the document.

It is still another object of the invention to provide a novel tape, ticket or other document containing coded intelligence which may essentially utilize conventional photoelectric sensing apparatus.

It is another object of the invention to provide a system which obviates the disadvantages inherent in generating punched-hole document and yet has excellent signal-to-noise ratio.

It is a further object of the invention to provide a document reader particularly adapted to read fluorescent-imprinted substantially translucent coded documents.

SUMMARY OF THE INVENTION

In the present invention, the machine-readable document essentially comprises a tape, card, ticket, etc., of translucent paper or other suitable composition such as a synthetic plastic, which has coded information imprinted thereon with fluorescent ink. The imprint of fluorescent ink is applied on the reverse side of the document which is to be read by the sensors. Reading of the document is preferably effected by projecting light on the face of the document by means of sensors such as photoelectric cells. The sensing means are conventional light-responsive elements, i.e., photoelectric cells which read the coded information after the fluorescent imprint or marking is energized by exposing the fluorescent imprint or marking to a suitable light source, by its nature, the ink projects its fluorescent glow through the document. The light-responsive means, i.e. the reader, positioned on the opposite side of the document from the light source, may be connected to a suitable data processor by means of a conventional decoder. It will be understood that the light may be projected on the document from the backside of the face which the imprint is applied provided that the substrate is such that the ultraviolet light is not unduly attenuated resulting in a glow which is too insubstantial to afford a suitable reading.

Since there is no requirement that light be projected on the surface of the document to generate a fluorescent response by reflection as in common practice in utilizing fluorescent markings, the photoelectric sensor may be placed close to the document, i.e. practically in contact with the face of the document, or in contact with a light filter which in turn is in close proximity or contact with the document. In the case of a tape, since there is no requirement that there be physical contact between the tape and the sensing means, the tape will have a longer life with a resulting savings in cost.

These and other objects of the present invention will become more fully apparent from the following specification and claims when considered in conjunction with the accompanying drawing wherein:

DETAILED DESCRIPTION

Figures 1, 2:
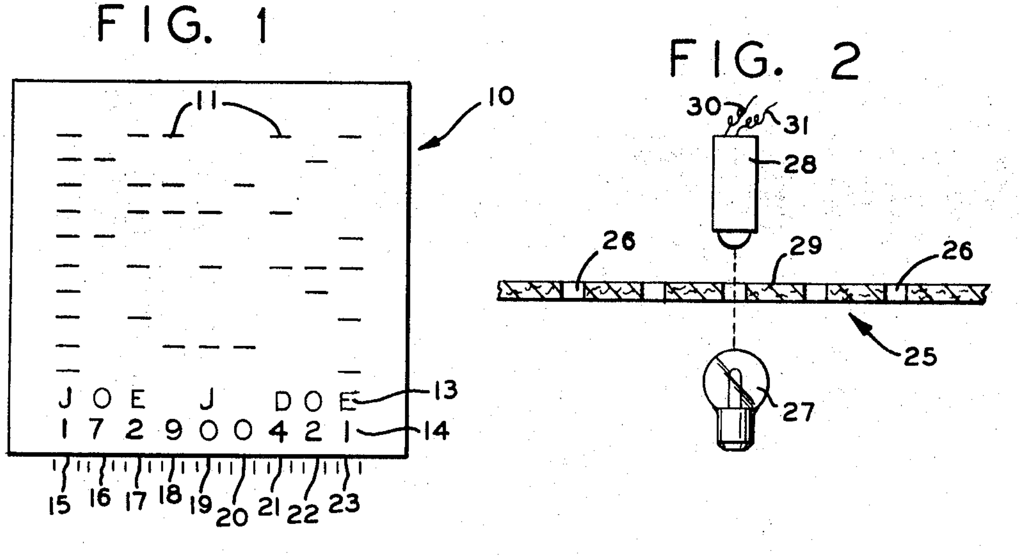
FIG. 1 is an illustrative illustrating the face of a document imprinted with coded information according to the invention.
FIG. 2 is a diagrammatic sectional view of a conventional scanning or reading device.

Referring now to the drawing, and in particular to FIG. 2, it is seen that when a conventional punched document 25 is decoded by an optical reader, the source of light 27 is on one side of the document, and the photosensors 28 are on the other side.

When a punched hole 26 in the document 25 moves into position so that it is in line with the light source 27 and the photosensor 28 light will enter the photosensor electronically registering the fact that a hole has been sensed. The signal thereupon transmitted via leads 30 and 31 to a data output system (not shown). When an opaque part 29 of the document 25 moves into this position, light to the sensor will be cut off denoting no signal. The signal-to-noise ration reflects the ratio of opaqueness of the card 25 to the amount of light transmitted through the hole 26.

The punched document reader illustrated in FIG. 2 uses the simplest type of optics compared with an optical reader that detects marks on the surface of a document by reflected light.

The resolution for the punched document is high and the signal to no-signal is also high.

The novel document and the means for its utilization in accordance with the invention as will be described below comprises a system which employs an optical reader in a similar manner to that of the punched document in FIG. 2, that is, the light will be on one side of the document and the optical sensors will be on the other side even though the document to be read dose not comprise a punched-hole format.

The substrate on which the new document is printed may be any suitable composition, and may include paper, composed of either vegetable, mineral, or synthetic fibers, as well as plastic sheet or tape, characterized as having substantial translucence. For example, the paper may be bond paper, pad paper, yellow teletype tape, tracing paper or other similar paper of appropriate thickness, The plastic may comprise any of a wide variety of polymer materials such as nylon, polyester, a polyolefin, polyethelyne or polypropylene, and the like, which may be suitably filled or pigmented, for example.

The substrate must be substantially translucent when held up to the light, especially to the light desired to be sensed, e.g. orange or red light. The ink or printing pigment must be the kind which will fluoresce the selected color for the optical sensor, e.g. an orange, red, or amber color under the ultraviolet light. To illustrate more specifically, in the case of a red-orange fluorescence, the light source will be an ultraviolet (black light) light source such as a fluorescent tube rich in UV. Preferably it is used in conjunction with a UV filter to cut out all visible light. Actually, a small amount of bluish-purple light will pass through the UV filter and will be present. The photosensors suitable for use with fluorescence in the orange-red spectrum reader are commercially available silicon phototransistor devices. Such sensors would be found most sensitive in the range of colors having a millimicron wavelength of from about 600 to about 730 and more preferably in the region of the orange, red and near infrared part of the spectrum having millimicron wavelengths of about 640 to about 700 of the normal solar spectrum. See Webster's Third International Dictionary, G. & C. Merriam Company 1968; page 448. The response of these silicon devices in the blue and green portion of the spectrum is very low (i.e. a small percentage of the response in comparison to that resulting from the red portion of the spectrum); as a practical matter, these devices are nearly blind to blue and green.

The character of the substrate upon which the intelligence is imprinted with fluorescent ink in accordance with the invention is preferably such that the document paper will have a very pale bluish cast or no visible cast where there is no printing. Ideally, the substrate will not itself fluoresce when irradiated with UV light. Wherever there is a printed character, e.g. of red or orange fluorescent ink, and light is projected thereon, there will be a sharp contrast, i.e. a vivid orange or red sharply defined character. The bluish part of the document, i.e. the substrate, will not affect the photosensor. When a fluorescent spot casts its light or glow as a result of UV radiation, the fluorescence will pass through the paper and the photosensor filter and activate the photosensor producing an output. In effect, the fluorescent spot when illuminated acts in essence and as a practical matter, as though it was a punched hole in the document, passing light on through to the photoelectric sensor.

The same type of simple optics which are used for punched-hole documents may be used for this type document. The only difference is that in place of a visible light source a UV light source and appropriate filters are preferably utilized.

FIG. 1 illustrates a typical document of the type contemplated by the invention. It should be understood that other codes and formats could also be used. As shown, the card 10 comprises nine vertical columns numbered 15 through 23. More or less than the nine columns may be employed. Nine print wheels (not shown) are utilized to print the code bars 11 and the alphanumeric symbols lines 13 and 14 on the card. All the characters are imprinted with fluorescent ink. The paper or other substrate as noted above is selected so as to be substantially translucent to the light glow resulting from the particular fluorescent color which have been applied on the substrate and activated with light; the glow is photoelectrically sensed through the substrate.

Figure 3:
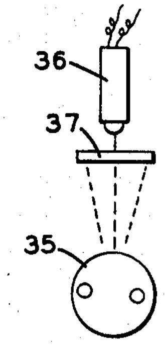
FIG. 3 is a diagrammatic sectional view of the main functional elements of a device which may be used to read the fluorescent imprinted document in accordance with the invention.

In FIG. 3 the elements of a reader which may be employed to photoelectrically sense the fluorescent imprint through the document are shown. As ultraviolet light source 35 which preferably incorporate a light filter and which blocks out all light except ultraviolet light, is used to activate the fluorescent ink which is picked up by sensor 36. As a specific embodiment, a separate filter 37 which passes orange and red but rejects the blue and green colors may be placed in front of the photosensor 36. Thus, the photoelectric sensor is almost blind to the blue-green light. With this arrangement, direct ultraviolet radiation on the photosensors produce no output for all practical purposes. With the above arrangement, the only significant light that reaches the photosensor 36 assuming its presence, is orange or red light.

Utilizing the essence of the arrangement of FIG. 3, it is seen that the ribbon or inking arrangement used in the computer printer will be composes of substances which will fluoresce brightly, preferably orange or red, under the influence of ultraviolet radiation. The computer will then be programmed to print out a suitable code in format with this ink on the translucent paper mentioned above. The coded characters are of a suitable configuration, generally in the form of bars or dots.

Figure 4:
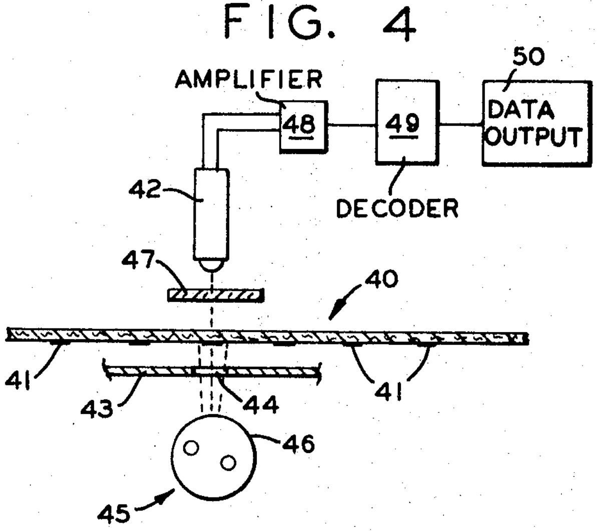
FIG. 4 is a diagrammatic view of the system of the invention showing a document in the reading device and a block diagram to illustrate a form of circuitry usable with the reader.

When a document as just described, is placed in the vicinity of an ultraviolet light source, the bars or dots will glow brightly in either orange or red colors. When the document is now placed in between the UV filter light source and the photosensor filter, a system of the kind depicted in greater detail in FIG. 4 is provided. FIG. 4 shows an arrangement which may be used for scanning the light impulses from fluorescent markings. The document e.g. ticket, tape or card 40 having fluorescent inkspots or bars 41 is moved past a guide plate 43 which has a slot 44 through which light is projected onto the surface of the fluorescent imprint 41. Behind the slot 44, and on the opposite side of the document from the photosensor 42, there is positioned an ultraviolet (UV) light source 45 preferably a UV fluorescent lamp provided with a filter envelope 46, or other filter, which allows ultraviolet but substantially no visible light to pass. Also, preferably, a filter 47 interposes between the document 40 and the sensor 42; the filter 47 substantially blocks all light with the exception of orange or red light which it is desired to reach the photoelectric element. Various means not shown for movement of the document past the photoelectric sensors are well know in the art and may include a manual operation, i.e. where a ticket or card is inserted into a slot. The signal sensed by the photoelectric sensor 42 is processed in a conventional manner such as through the amplifier 48 and the decoder 49 to provide the desired output 50. Suitable supporting mechanisms (not shown) for the elements of FIG. 4 together with a housing capable of substantially excluding stray light is utilized.

While the invention has been described by reference to specific particulars in order to provide a full, clear, and concise explanation of the inventive contribution, various modifications in the invention will be apparent to those skilled in the art without departing from the scope and spirit of the invention.

What is claimed is:

1. A method of electronically retrieving coded intelligence from a document which comprises a substantially translucent substrate and on which the coded intelligence has been imprinted with fluorescent ink, the steps comprising exposing the substrate to a source of ultraviolet light, photoelectrically sensing said imprinted intelligence while it is activated and converted to visible light images by said ultraviolet light through the translucent substrate and utilizing the intelligence data output thus derived photoelectrically from said fluorescent imprint.

2. The method of claim 1 wherein the light source is ultraviolet light.

3. The method of claim 1 wherein the fluorescent ink is in the amber, orange, red range which has a millimicron wavelength in the normal solar spectrum of from about 600 to about 730.

4. The method of claim 1 wherein the imprinted side of the document is exposed to the light source.

5. The method of claim 1 wherein the fluorescence activated by said light and passing through said substrate is first filtered to substantially exclude undesired visible light before the fluorescence is photooptically sensed.

6. An apparatus for reading a document composed of a substantially translucent substrate upon which coded information is imprinted with fluorescent ink, comprising a support for said document, a light source arranged on one side of said support to transmit light upon said document, detector means comprising a photoelectric cell positioned in alignment with but on the opposite side of said support from the light source so as to sense the fluorescent imprint through the document substrate, a filter adapted to be interposed between said document and photoelectric cell to screen undesired visible light, said photoelectric cell being capable of generating electrical signals representative of the pattern of coded information sensed from the fluorescent imprint on said document, and a suitable housing, capable of substantially excluding stray light, enclosing said ticket-receiving slot, light source and detector means.

7. The apparatus of claim 6 wherein the light source is ultraviolet light which incorporates a filter envelope.